(12) United States Patent
Albrecht et al.

(10) Patent No.: US 7,782,561 B2
(45) Date of Patent: Aug. 24, 2010

(54) PATTERNED MAGNETIC RECORDING MEDIUM WITH DATA ISLAND PATTERN FOR IMPROVED READING AND WRITING AND MAGNETIC RECORDING SYSTEM INCORPORATING THE MEDIUM

(75) Inventors: Thomas R. Albrecht, San Jose, CA (US); Michael A. Moser, San Jose, CA (US); Manfred Ernst Schabes, Saratoga, CA (US); Xiao Z. Wu, San Jose, CA (US)

(73) Assignee: Hitachi Global Storage Technologies Netherlands B.V., Amsterdam (NL)

( * ) Notice: Subject to any disclaimer, the term of this patent is extended or adjusted under 35 U.S.C. 154(b) by 683 days.

(21) Appl. No.: 11/680,398

(22) Filed: Feb. 28, 2007

(65) Prior Publication Data
US 2008/0204915 A1 Aug. 28, 2008

(51) Int. Cl.
*G11B 5/09* (2006.01)
(52) U.S. Cl. ........................................................ 360/48
(58) Field of Classification Search ........................ None
See application file for complete search history.

(56) References Cited

U.S. PATENT DOCUMENTS

| | | | |
|---|---|---|---|
| 5,920,447 A * | 7/1999 | Sakata et al. | 360/121 |
| 6,440,520 B1 | 8/2002 | Baglin et al. | |
| 6,754,017 B2 | 6/2004 | Rettner et al. | |
| 6,937,421 B2 | 8/2005 | Rubin et al. | |
| 2002/0136927 A1 * | 9/2002 | Hieda et al. | 428/694 T |
| 2005/0094298 A1 | 5/2005 | Sakurai et al. | |
| 2006/0285257 A1 | 12/2006 | Albrecht et al. | |
| 2007/0258161 A1 | 11/2007 | Richter et al. | |

FOREIGN PATENT DOCUMENTS

| JP | 2003157631 | 5/2003 |
|---|---|---|
| JP | 2005122820 A | 5/2005 |
| JP | 2006079827 | 3/2006 |

OTHER PUBLICATIONS

Moritz et al., "Patterned Media Made From Pre-Etched Wafers: A Promising Route Toward Ultrahigh-Density Magnetic Recording", IEEE Transactions on Magnetics, vol. 38, No. 4, Jul. 2002, pp. 1731-1736.

* cited by examiner

*Primary Examiner*—Daniell L Negrón
(74) *Attorney, Agent, or Firm*—Thomas R. Berthold

(57) ABSTRACT

A patterned magnetic recording medium has discrete data islands arranged in spaced-apart tracks, with the tracks being arranged in multi-track groups or "hypertracks". The islands have an equal island-spacing (IS) distance in the along-the-track direction and within each hypertrack the tracks are spaced-apart an equal track-spacing (TS) distance. If there are N tracks in a hypertrack then the islands in each track of a hypertrack are shifted in the along-the-track direction by 1/N times IS from the islands in adjacent tracks in the same hypertrack. The read and write heads have a lateral or cross-track width generally equal to the cross-track width of a hypertrack, so the read and write heads span all the individual tracks in a hypertrack. The hypertracks are spaced apart cross-track direction by a group-spacing (GS) distance, with GS being greater than TS. The islands in a hypertrack may be shifted in the along-the-track direction by approximately ½N times IS from the islands in adjacent hypertracks.

17 Claims, 7 Drawing Sheets

PATTERNED MAGNETIC RECORDING MEDIUM WITH DATA ISLAND PATTERN FOR IMPROVED READING AND WRITING AND MAGNETIC RECORDING SYSTEM INCORPORATING THE MEDIUM

BACKGROUND OF THE INVENTION

1. Field of the Invention

This invention relates generally to patterned magnetic recording media, such as disks for use in magnetic recording hard disk drives, and more particularly to a patterned medium and recording system wherein the data islands are arranged in a pattern that improves reading and writing.

2. Description of the Related Art

Magnetic recording hard disk drives with patterned magnetic recording media have been proposed to increase data density. In a patterned medium the magnetic recording layer on the disk is patterned into small isolated data islands arranged in concentric data tracks. Patterned-media disks may be longitudinal magnetic recording disks, wherein the magnetization directions are parallel to or in the plane of the recording layer, or perpendicular magnetic recording disks, wherein the magnetization directions are perpendicular to or out-of-the-plane of the recording layer. To produce the required magnetic isolation of the patterned data islands, the magnetic moment of the spaces between the islands must be destroyed or substantially reduced to render these spaces essentially nonmagnetic. In one type of patterned media, the data islands are elevated, spaced-apart pillars that extend above the disk substrate surface to define troughs or trenches on the substrate surface between the pillars. The magnetic recording layer material is then deposited over the entire surface of the substrate to cover both the ends of the pillars and the trenches. The trenches are recessed from the tops of the pillars so they are far enough from the read/write head to not adversely affect reading or writing.

In the proposed patterned disks, the data islands are equally spaced along single data tracks with the data tracks being equally spaced in the radial or cross-track direction. The read and write heads read and write the data islands on a single track so the data islands are typically sized to generally match the lateral or cross-track width of the heads. The data islands are spaced to define a bit aspect ratio (BAR), i.e., the ratio of the cross-track width to the along-the-track width required for a single bit, of near 1:1 because it is difficult to fabricate data islands with a BAR much greater than 1:1. However, it is difficult to fabricate heads with the proper performance for very narrow tracks with data islands having this low BAR. Also, if the single data tracks are too closely spaced, islands in tracks adjacent to the track being written may also be written by fringing fields from the write head, and the readback signal from a data track being read may receive interference from data recorded in adjacent tracks. To address these problems a patterned media disk drive has been proposed with heads that are two tracks wide. This allows the heads to be wider, which makes them easier to fabricate, and also allows the drive to read and write two tracks at a time, thereby doubling the data rate and bringing the performance closer to conventional disk drives. This type of patterned media disk drive is described in U.S. Pat. No. 6,937,421. However, regardless of the type of patterned media disk drive, i.e., whether the heads are a single-track wide or two tracks wide, there is no accommodation of the data island spacing and track spacing to maximize the areal data density.

What is needed is a patterned magnetic recording medium, and recording system that incorporates the medium, that results in improved reading and writing of the data islands as well as increased areal data density.

SUMMARY OF THE INVENTION

The invention is a patterned magnetic recording medium with an improved pattern of data islands. The data islands are arranged in tracks spaced-apart in the radial or cross-track direction, with the tracks being arranged in radially-spaced multi-track groups or "hypertracks". The islands have an equal island-spacing (IS) distance in the along-the-track direction and within each hypertrack the tracks are spaced-apart in the radial or cross-track direction at an equal track-spacing (TS) distance. If there are N tracks in a hypertrack then the islands in each track of a hypertrack are shifted in the along-the-track direction by 1/N times the island-spacing (IS) from the islands in adjacent tracks in the same hypertrack. The read and write heads have a lateral or cross-track width generally equal to the cross-track width of a hypertrack, so the read and write heads span all the individual tracks in a hypertrack. The heads read or write all the data islands in a hypertrack by alternately reading or writing the islands from each of the tracks in succession. To read or write to different hypertracks the read/write head is moved from the center of one hypertrack to the center of the hypertrack where data is to be read or written.

The hypertracks are spaced apart in the radial or cross-track direction by a group-spacing (GS) distance, which is the cross-track spacing between the two outer tracks in adjacent hypertracks, with GS being greater than TS. This GS distance prevents fringing magnetic fields from the write head from inadvertently writing any of the islands in hypertracks adjacent to the hypertrack being written. Also, the islands in a hypertrack are optionally shifted in the along-the-track direction by approximately ½N times the along-the-track island-spacing (IS) from the islands in adjacent hypertracks. This results in readback pulses from one hypertrack being shifted in phase so that they lie approximately at the midpoint between readback pulses from adjacent hypertracks. This "out of phase" condition minimizes interference from hyper-tracks adjacent to the hypertrack being read, resulting in a reduction in error rate.

The hypertracks enable very close packing of the data islands such that the data islands in adjacent data tracks can overlap, although there is no overlap between adjacent hyper-tracks. As a result the track spacing TS can be less than or equal to the island spacing IS, resulting in increased areal data density.

The invention is also a magnetic recording system that incorporates the patterned medium.

For a fuller understanding of the nature and advantages of the present invention, reference should be made to the following detailed description taken together with the accompanying figures.

DETAILED DESCRIPTION OF THE INVENTION

Figure 1:
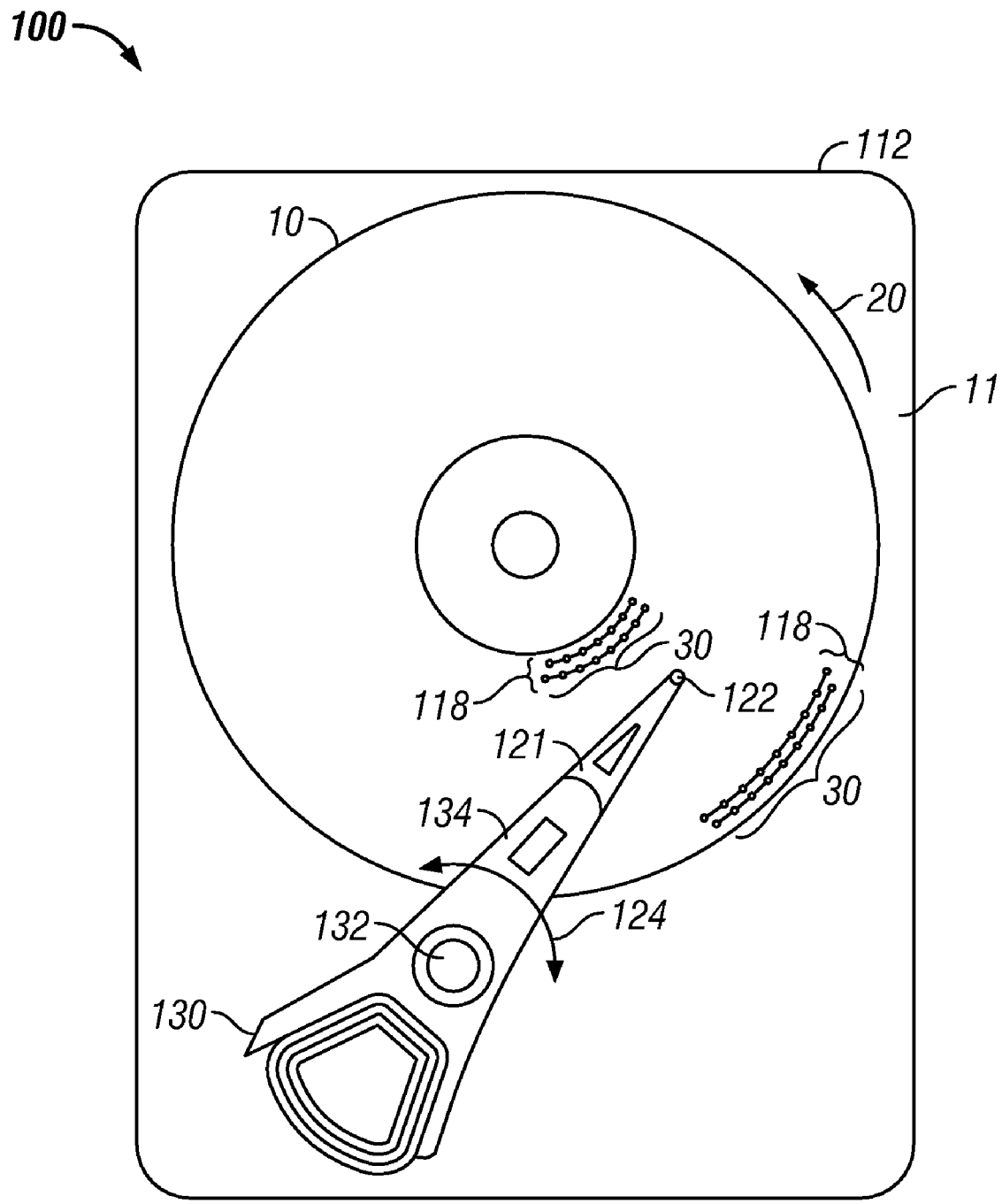
FIG. 1 is a top view of a disk drive with a patterned magnetic recording disk.

The magnetic recording medium and system of this invention will be described in terms of a magnetic recording disk and disk drive. FIG. 1 is a top view of a disk drive 100 with a patterned magnetic recording disk 10. The drive 100 has a housing or base 112 that supports an actuator 130 and a drive motor for rotating the magnetic recording disk 10. The actuator 130 may be a voice coil motor (VCM) rotary actuator that has a rigid arm 134 and rotates about pivot 132 as shown by arrow 124. A head-suspension assembly includes a suspension 121 that has one end attached to the end of actuator arm 134 and a head carrier 122, such as an air-bearing slider, attached to the other end of suspension 121. The suspension 121 permits the head carrier 122 to be maintained very close to the surface of disk 10. A magnetoresistive read head (not shown) and an inductive write head (not shown) are typically formed as an integrated read/write head patterned on the trailing surface of the head carrier 122, as is well known in the art.

The patterned magnetic recording disk 10 includes a disk substrate 11 and discrete data islands 30 of magnetizable material on the substrate 11. The data islands 30 are arranged in radially-spaced circular tracks 118, with only a few islands 30 and representative tracks 118 near the inner and outer diameters of disk 10 being shown in FIG. 1. As the disk 10 rotates in the direction of arrow 20, the movement of actuator 130 allows the read/write head on the trailing end of head carrier 122 to access different data tracks 118 on disk 10. The writing on patterned media requires the synchronization of the write pulses with the pattern of islands. A patterned media magnetic recording system that uses the magnetized islands to clock the writing is described in U.S. Pat. No. 6,754,017.

Figure 2:
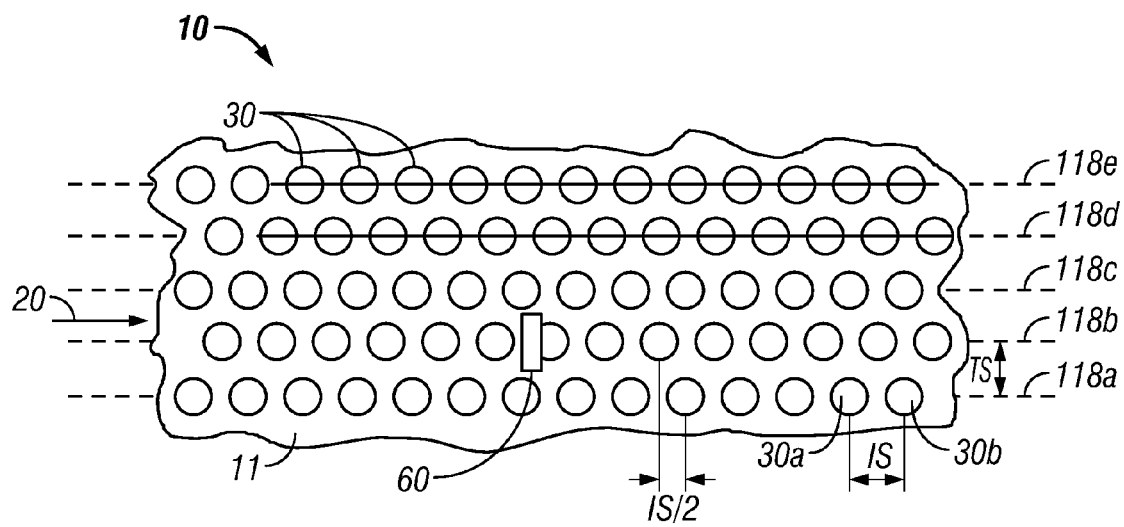
FIG. 2 is a top view of an enlarged portion of the disk shown in FIG. 1 showing the detailed arrangement of the data islands according to the prior art.

FIG. 2 is a top view of an enlarged portion of disk 10 showing the detailed arrangement of the data islands 30 on the surface of disk substrate 11 according to the prior art. The islands 30 contain magnetizable recording material and are arranged in tracks spaced-apart in the radial or cross-track direction, as shown by tracks 118a-118e. The tracks are equally spaced apart by a fixed track spacing TS.

Patterned-media disks like that shown in FIG. 2 may be longitudinal magnetic recording disks, wherein the magnetization directions in the magnetizable recording material are parallel to or in the plane of the recording layer in the islands, or perpendicular magnetic recording disks, wherein the magnetization directions are perpendicular to or out-of-the-plane of the recording layer in the islands. To produce the required magnetic isolation of the patterned data islands, the magnetic moment of the regions between the islands must be destroyed or substantially reduced to render these spaces essentially nonmagnetic. Patterned media may be fabricated by any of several known techniques. In one technique a continuous magnetic film is deposited onto a substrate and the film is then ion-beam etched to form the separate data islands.

Figure 3:
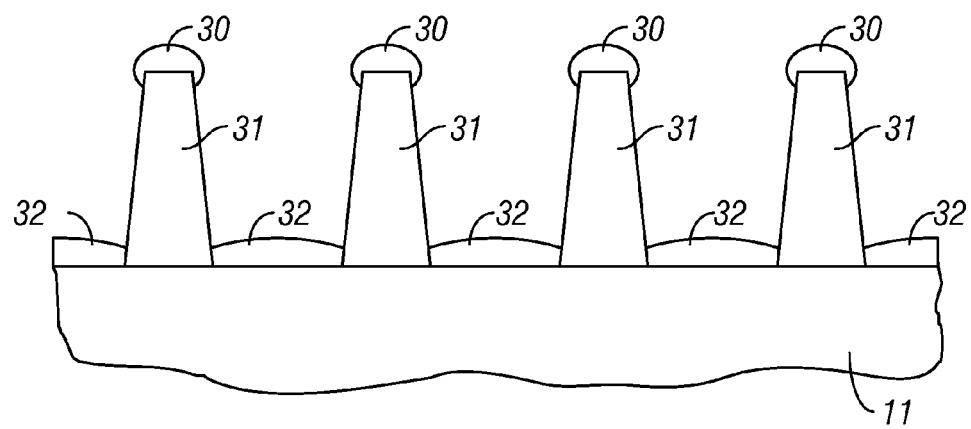
FIG. 3 is a sectional view of a type of patterned media wherein the data islands are elevated, spaced-apart pillars that extend above the substrate.

In another type of patterned media, the data islands are elevated, spaced-apart pillars that extend above the disk substrate surface to define troughs or trenches on the substrate surface between the pillars. This type of patterned media is shown in the sectional view in FIG. 3. In this type of patterned media the substrate 11 with a pre-etched pattern of pillars 31 and trenches or regions between the pillars can be produced with relatively low-cost, high volume processes such as lithography and nanoimprinting. The magnetic recording layer material is then deposited over the entire surface of the pre-etched substrate to cover both the ends of the pillars 31 and the trenches between the pillars 31, resulting in the data islands 30 of magnetic recording layer material and trenches 32 of magnetic recording layer material. The trenches 32 of recording layer material are spaced far enough from the read/write head to not adversely affect reading or writing to the recording layer material in islands 30. This type of patterned media is described in U.S. Pat. No. 6,440,520, and by Moritz et al., "Patterned Media Made From Pre-Etched Wafers: A Promising Route Toward Ultrahigh-Density Magnetic Recording", *IEEE Transactions on Magnetics*, Vol. 38, No. 4, July 2002, pp. 1731-1736.

Referring again to the prior art pattern of FIG. 2, within each track the islands are equally spaced apart by a fixed island spacing IS, as shown by typical islands 30a, 30b, where IS is the spacing between the centers of two adjacent islands. Also, the islands in each track are shifted in the along-the-track direction by one-half the island spacing (IS/2) from the islands in adjacent tracks. For example, in FIG. 2 the islands in track 118b are shifted to the left a distance IS/2 from the islands in adjacent tracks 118a and 118c.

FIG. 2 also shows a head element 60, which may represent either a read head or a write head, aligned over the center of track 118b. If the element 60 is a read head, then as the disk rotates in the direction of arrow 20, the magnetized data islands in track 118b will pass the head element 60 and generate a specific readback signal, depending on the directions of magnetization of the individual islands. However, because the islands in adjacent tracks 118a and 118c are shifted in the along-the-track direction by a distance IS/2 from the islands in track 118b, any readback signal interference from these adjacent tracks will be out of phase with the readback signal from track 118b, the track being read. This results in a substantially reduced error rate for the data being read.

Figure 4:
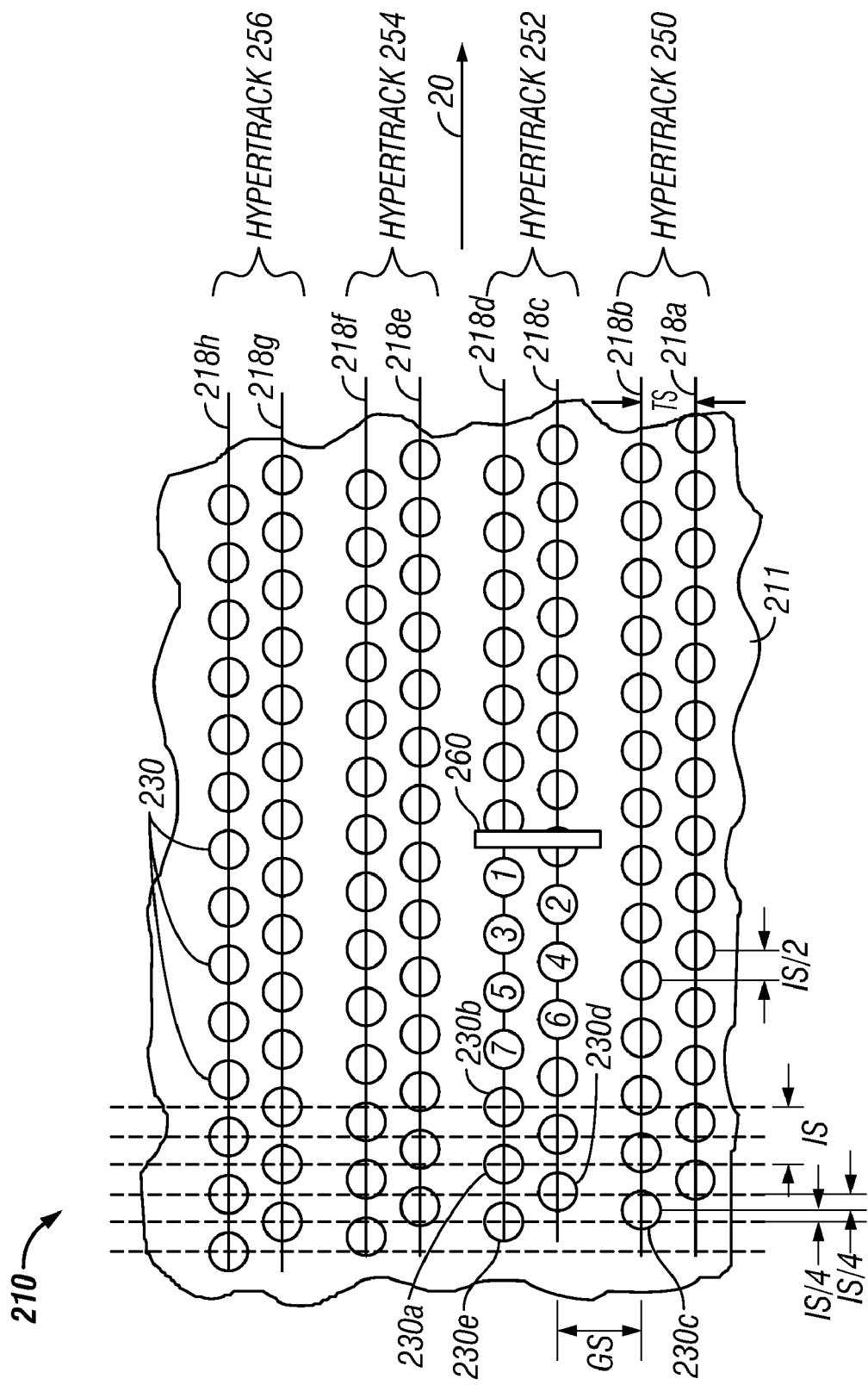
FIG. 4 is a top view of an enlarged portion of a disk showing the detailed arrangement of the data islands according to this invention.

FIG. 4 is a top view of an enlarged portion of a disk 210 according to this invention showing the detailed arrangement of the data islands 230 on the surface of disk substrate 211. The islands 230 are arranged in tracks spaced-apart in the radial or cross-track direction, as shown by tracks 218a-218h. The tracks are arranged in radially-spaced multi-track groups, which may also be called "hypertracks", shown as two-track groups or hypertracks 250, 252, 254, 256.

Within each hypertrack, the tracks are spaced-apart in the radial or cross-track direction a distance TS, as shown by tracks 281a and 218b in hypertrack 250, where TS is the distance between the centerlines of two adjacent tracks. The islands in each track have an equal island spacing IS, as shown by islands 230a, 230b in track 218d. Also, the islands in each track of a hypertrack are shifted in the along-the-track direction by one-half the island spacing (IS/2) from the islands in adjacent tracks in the same hypertrack, as shown for example by track 218a in hypertrack 250 being shifted to the right a distance IS/2 from the islands in track 218b in hypertrack 250.

The hypertracks are spaced apart a group-spacing (GS) distance, which is the cross-track spacing between the two outer tracks in adjacent hypertracks, as shown by distance GS between track 218b in hypertrack 250 and track 218c in hypertrack 252. The distance GS is greater than TS, preferably at least about 1.2 times TS. Also, the islands in a hypertrack may optionally be shifted in the along-the-track direction by approximately one-quarter the along-the-track island spacing (IS/4) from the islands in adjacent hypertracks. For example, the islands in track 218b of hypertrack 250 are shifted to the left by IS/4 from the islands in track 218c of hypertrack 252 and to the right by IS/4 from the islands in track 218d of hypertrack 252, as represented by island 230c in track 218b, island 230d in track 218c and island 230e in track 218d. Similarly, the islands in track 218a of hypertrack 250 are shifted to the left by IS/4 from the islands in track 218d of hypertrack 252 and to the right by IS/4 from the islands in track 218c of hypertrack 252. This optional shifting of adjacent hypertracks in the along-the-track direction results in readback pulses from one hypertrack being shifted in phase so that they lie approximately at the midpoint between readback pulses from adjacent hypertracks. This "out of phase" condition minimizes interference from hypertracks adjacent to the hypertrack being read, resulting in a reduction in error rate.

FIG. 4 also shows a head element 260, which may represent either a read head or a write head, aligned over the center of hypertrack 252 and substantially spanning all the tracks in hypertrack 252. The head element reads or writes all the data islands in hypertrack 252 by alternately reading or writing the islands from each of the tracks 218c, 218d in succession. For example, if the element 260 is a read head, then as the disk rotates in the direction of arrow 20, the magnetized data islands in tracks 218c, 218d will be detected in sequential order, as shown by numbers 1-7 on the islands. If the head element 260 is a write head, then because of the hypertrack spacing GS, which is greater than TS, the fringing magnetic fields from the write head will not inadvertently write any of the islands in hypertracks adjacent to the hypertrack being written. To read or write to different hypertracks the read/write head is moved from the center of one hypertrack (for example midway between tracks 218a and 218b) to the center of the hypertrack where data is to be read or written (for example midway between tracks 218g and 218h).

Figure 5:
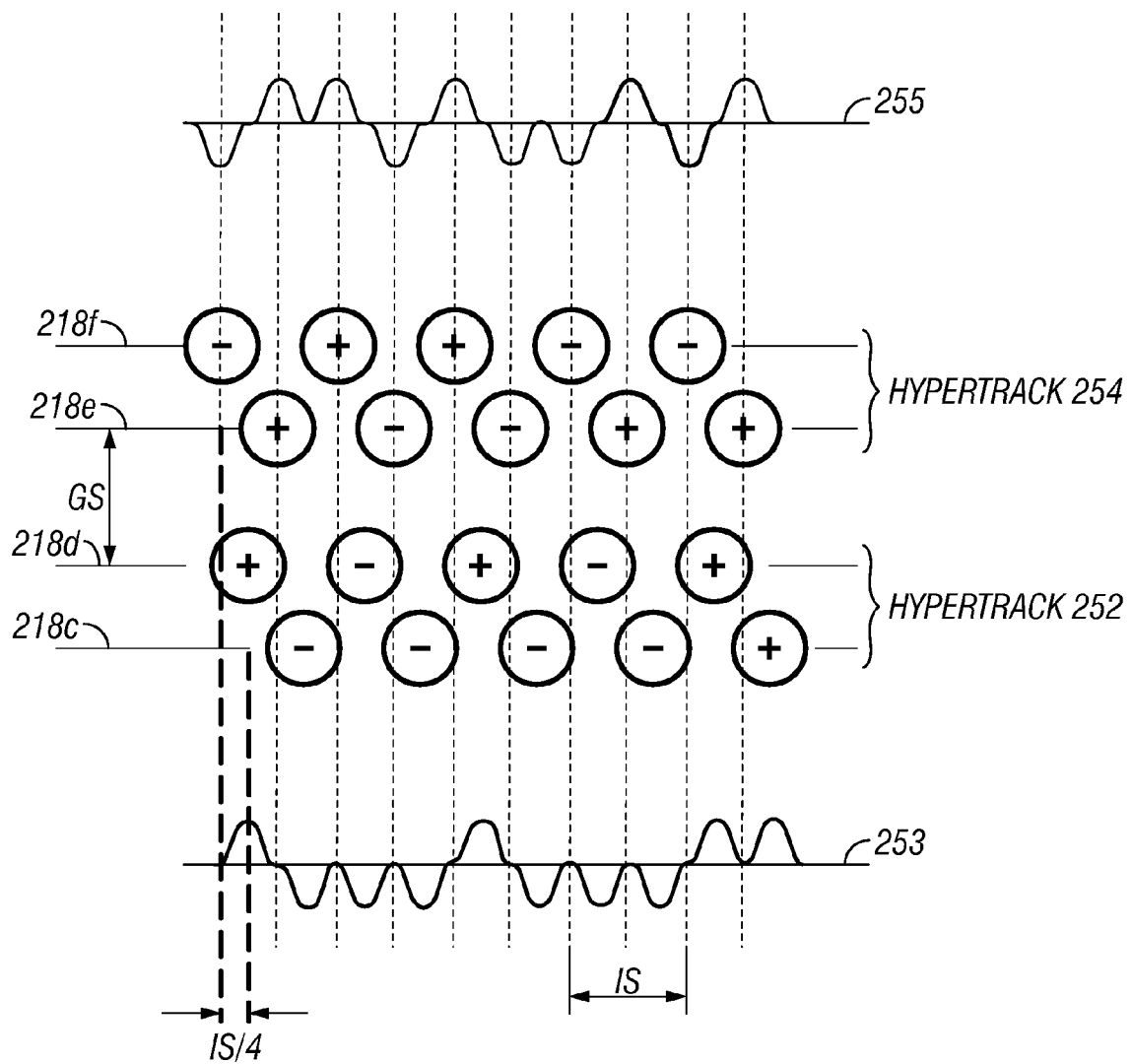
FIG. 5 is an illustration of two hypertracks according to this invention showing the along-the-track shift of the islands in adjacent hypertracks and the resulting readback signals.

FIG. 5 illustrates how the along-the-track shift of the islands in adjacent hypertracks improves the readback signal. In FIG. 5, the islands in hypertrack 254 are shifted from the islands hypertrack 252 by a distance IS/4 in the along-the-track direction, where IS is the spacing between islands in the along-the-track direction. The (−) sign on the islands represents negative magnetization (perpendicularly into the paper) and the (+) sign on the islands represents positive magnetization (perpendicularly out of the paper), which are random magnetization states corresponding to typical user data. As can be seen in the simulated readback signals 253, 255 for hypertracks 252, 254, respectively, each positive island produces a positive pulse, and each negative island produces a negative pulse. The pulses (of either polarity) on one hypertrack are shifted in phase so that they lie approximately at the midpoint between pulses (of either polarity) in the adjacent hypertrack. This is the "out of phase" condition with minimum adjacent hypertrack interference and results in a reduction in error rate.

In one example of a patterned magnetic recording disk with the arrangement of islands as shown in FIG. 4, each data island may have a diameter of 22.1 nm, IS may be 36.8 nm, TS may be 31.9 nm, and GS may be 38.2 nm. This would result in a disk with linear or along-the-track bit density of 1380 kilobits-per-inch (kbpi), a track density of 362,000 hypertracks-per-inch, and an areal density of 500 Gigabits-per-square-inch (Gbits/in$^2$).

Figure 6:
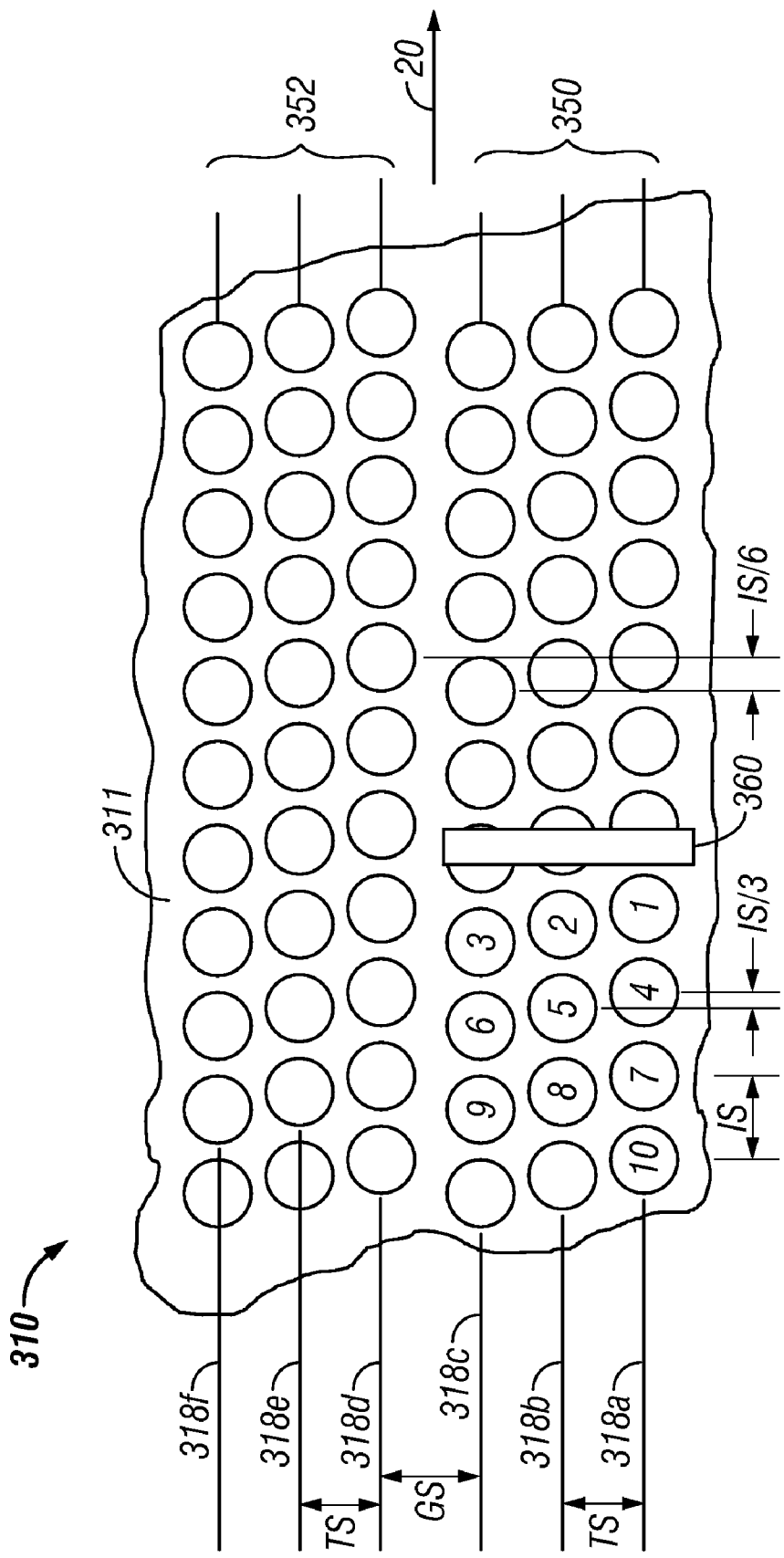
FIG. 6 is a top view of an enlarged portion of a patterned media with a three-track per hypertrack pattern according to this invention.

The invention is not limited to two tracks per hypertrack but may have N tracks per hypertrack, where N is two or more. The islands in each track of an N-track hypertrack would be shifted in the along-the-track direction from adjacent tracks in the hypertrack by a distance IS/N, and the optional shifting of the islands in adjacent hypertracks in the along-the-track direction would be by a distance IS/2N. FIG. 6 is a top view of an enlarged portion of a disk 310 with a three-track per hypertrack pattern on substrate 311 and showing six representative tracks 318a-318f grouped into two hypertracks 350, 352, with the islands in each track of a hypertrack shifted in the along-the-track direction by IS/3 from adjacent tracks in the hypertrack. Hypertracks 350, 352 are spaced apart a distance GS and the islands in the two hypertracks are shifted from each other in the along-the-track direction by a distance IS/6. As the disk rotates in the direction 20, the read or write head 360 will read or write the data islands in the sequential order 1-10 as shown by the numbers on the data islands in hypertrack 350.

Figure 7A:
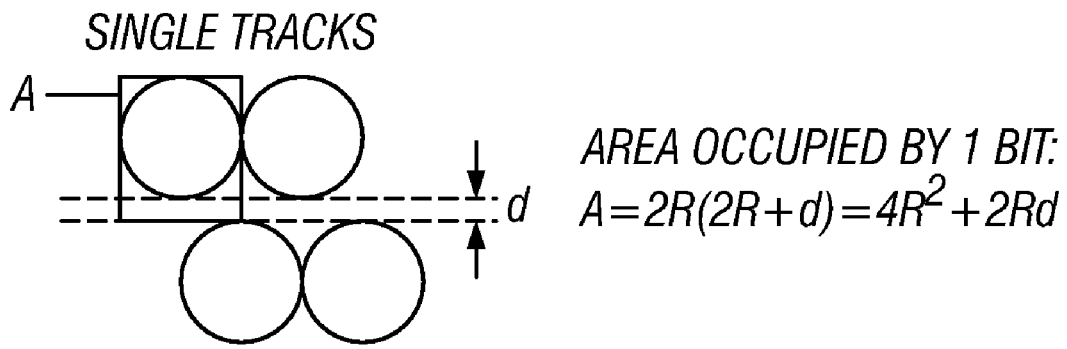
FIG. 7A is an illustration of a prior art single-track arrangement of data islands, showing the area occupied by a single bit.

For the prior art single-track arrangement of the islands, two adjacent tracks can not have any overlap because of the concern for adjacent track interference. In fact, significant space may be needed between single tracks to allow for track-misregistration and finite cross-track write-field gradient. Therefore, the areal data density has to be lower than for hexagonal close-packing of the islands. In addition, if it is assumed there is a gap d between two adjacent single tracks, then there is a gap d for each single track and the area occupied by each bit is:

$$4R^2+2Rd,$$

where R is radius of a circular data island and 2R is the along-the-track spacing IS of the islands. This is illustrated in FIG. 7A.

However, for comparison with a two-track (N=2) hypertrack according to this invention, the two tracks in a hypertrack can have the islands packed tightly with hexagonal close-packing (which actually overlaps the two tracks slightly), although there should not be any overlap between adjacent hypertracks. Also, there is only one gap d needed for each hypertrack (two tracks), compared to one gap d needed for each track in the single-track arrangement. Consequently, the area occupied by each bit is:

$$(2+\sqrt{3})R^2+Rd.$$

Figure 7B:
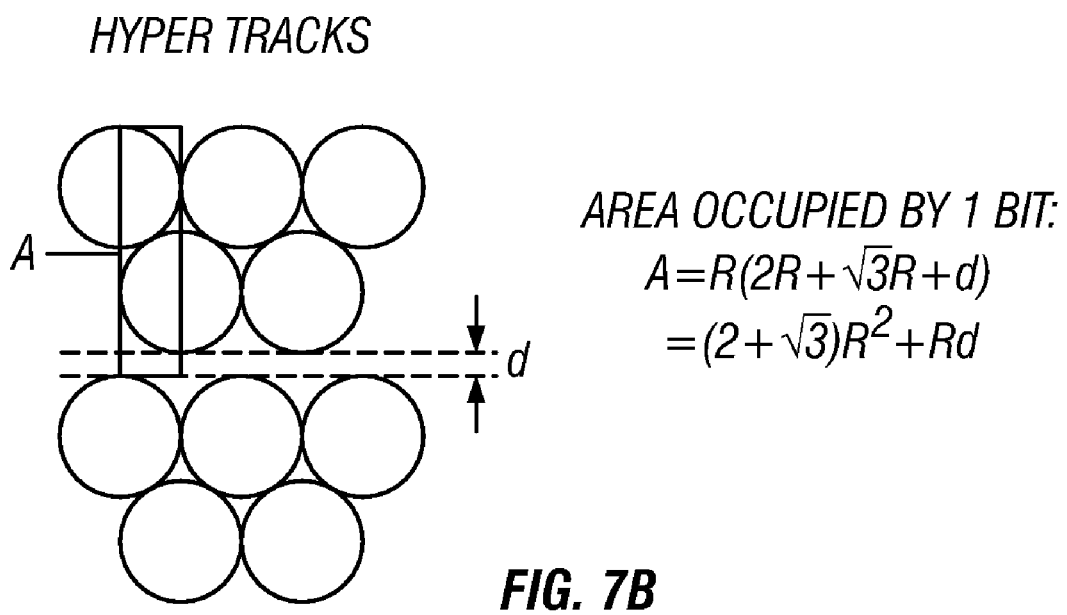
FIG. 7B is an illustration of a two-track hypertrack of data islands according to this invention, showing the area occupied by a single bit.

This is illustrated in FIG. 7B. As shown in FIG. 7B, the two tracks in a hypertrack can overlap, as illustrated by track spacing TS being less than the island spacing IS.

The amount of areal data density (AD) gain depends on the ratio of d to R, and is given by the following formula:

$$AD_{Hypertrack}/AD_{Single-track}=2(1+x)/[1+(\sqrt{3})/2+x],$$
where x=d/2R.

Figure 8:
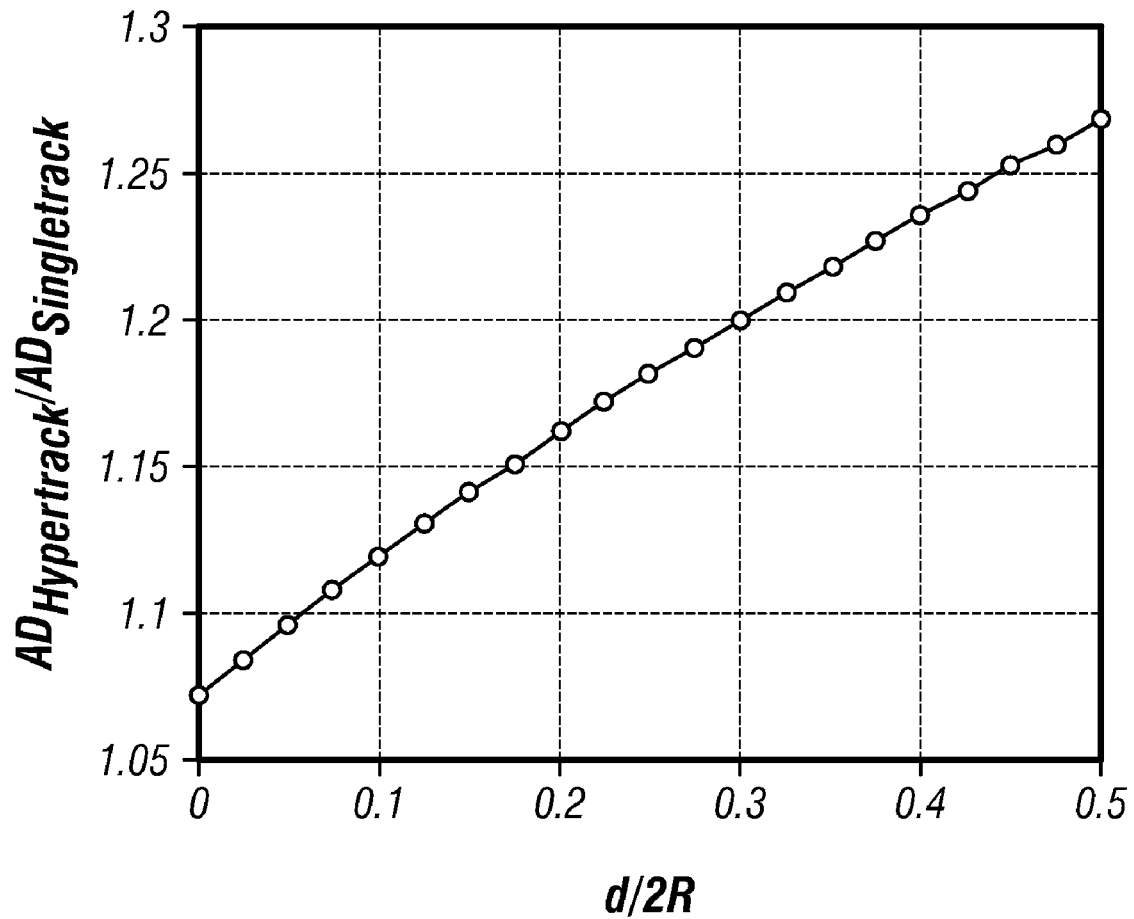
FIG. 8 is a graph of areal data density gain for a hypertrack as a ratio of d/R, where d is the gap between adjacent hypertracks and R is the radius of a circular data island.

The amount of areal data density gain is shown by the graph of FIG. 8 for a typical range of values for d/2R. As can be seen from FIG. 8, the use of hypertracks, which allow the tracks within a hypertrack to have a much closer spacing than in the single-track arrangement, can provide approximately a 7-25% gain in areal data density.

FIGS. 7A-7B also illustrate the increased BAR for the hypertrack. The BAR for the single-track arrangement of FIG. 7A is given by:

$$(2R+d)/2R=1+(\tfrac{1}{2})(d/R),$$

while for the hypertrack of FIG. 7B, the BAR is given by:

$$(2R+\sqrt{3}R+d)/R=2+\sqrt{3}+(d/R).$$

For a typical d/2R value of 0.4, the BAR for the hypertrack is 4.13 (compared to 1.20 for the single-track arrangement), which makes the head fabrication much easier.

The patterned magnetic recording medium of this invention has been described above as a magnetic recording disk with concentric data tracks spaced apart in the radial or cross-track direction. However, the medium may also be implemented as magnetic tape or as magnetic stripes in credit cards and "smart" cards, in which case the tracks would be linear tracks spaced apart in the cross-track direction. Also, while the data islands have been represented in the figures as having a circular shape, the invention is not limited by the shape of the islands.

While the present invention has been particularly shown and described with reference to the preferred embodiments, it will be understood by those skilled in the art that various changes in form and detail may be made without departing from the spirit and scope of the invention. Accordingly, the disclosed invention is to be considered merely as illustrative and limited in scope only as specified in the appended claims.

What is claimed is:

1. A magnetic recording medium comprising:
   a substrate;
   a plurality of discrete magnetizable islands on the substrate, the islands being arranged into a plurality of spaced-apart tracks;
   wherein the tracks are arranged into groups of N tracks, where N is equal to or greater than 2, with the islands in each track in a group being shifted along-the-track from the islands in adjacent tracks in the group by a first shift amount, wherein no island in a group is aligned in the along-the-track direction with another island in the group; and
   wherein each group is spaced from adjacent groups a distance greater than the track spacing within the group and the islands in a group are shifted in the along-the-track direction from the islands in adjacent groups by a second shift amount different from said first shift amount, wherein no island in a group is aligned in the along-the-track direction with an island in an adjacent group.

2. The recording medium according to claim 1 wherein the islands in each track are generally equally-spaced in the along-the-track direction with a spacing IS between the centers of adjacent islands.

3. The recording medium according to claim 1 wherein the islands in each track are generally equally-spaced in the along-the-track direction and the islands in each track in a group are shifted along-the-track by approximately 1/N times the along-the-track island spacing from the islands in adjacent tracks in the group.

4. The recording medium according to claim 1 wherein the islands in a group are shifted in the along-the-track direction by approximately ½N times the along-the-track island spacing from the islands in adjacent groups.

5. The recording medium according to claim 1 wherein the spacing between the centerlines of the spaced-apart tracks is a distance TS, wherein the islands are generally equally-spaced in the along-the-track direction with a spacing IS between the centers of adjacent islands, and wherein TS is less than or equal to IS.

6. The medium of claim 1 wherein the islands are magnetizable in a direction generally parallel to the substrate.

7. The medium of claim 1 wherein the islands are magnetizable in a direction generally perpendicular to the substrate.

8. The medium of claim 1 wherein the tracks are generally linear tracks.

9. The medium of claim 1 wherein the spaced-apart tracks are generally concentric circular tracks.

10. The medium of claim 1 wherein the islands are pillars extending generally perpendicularly from the substrate with magnetizable material on the tops of the pillars.

11. A patterned magnetic recording disk comprising:
    a substrate;
    a plurality of discrete magnetizable islands on the substrate, the islands being arranged into a plurality of circular concentric tracks with generally equal along-the-track island spacing IS, where IS is the spacing between the centers of adjacent data islands;
    wherein the tracks are arranged into hypertracks of N radially adjacent tracks, where N is equal to or greater than 2, with generally equal track spacing TS in each hypertrack, where TS is the spacing between the centerlines of adjacent tracks, and with the islands in each track in a hypertrack being shifted along the track by approximately IS/N from the islands in radially adjacent tracks in the hypertrack; and
    wherein each hypertrack is spaced from radially adjacent hypertracks a distance greater than TS, the islands in a hypertrack are shifted in the along-the-track direction by approximately IS/2N from the islands in adjacent hypertracks, and no island in a hypertrack is aligned in the along-the-track direction with an island in an adjacent hypertrack.

12. The disk of claim 11 wherein TS is less than or equal to IS.

13. The disk of claim 11 wherein the islands are magnetizable in a direction generally parallel to the substrate.

14. The disk of claim 11 wherein the islands are magnetizable in a direction generally perpendicular to the substrate.

15. The disk of claim 11 wherein the islands are pillars extending generally perpendicularly from the substrate with magnetizable material on the tops of the pillars.

16. A magnetic recording disk drive comprising:
    the disk according to claim 11; and
    a read head having a cross-track width greater than TS for reading all the islands in a hypertrack without movement in the cross-track direction.

17. The disk drive of claim 16 further comprising a write head having a cross-track width greater than the TS for magnetizing all the islands in a hypertrack without movement in the cross-track direction.

* * * * *